United States Patent
Yavid et al.

(10) Patent No.: US 12,132,421 B1
(45) Date of Patent: Oct. 29, 2024

(54) ELECTRIC POWER GENERATOR FOR A PROJECTILE MOVING THROUGH THE AIR

(71) Applicants: Dmitriy Yavid, Stony Brook, NY (US); Mykola Rabchevskiy, Ewing, NJ (US)

(72) Inventors: Dmitriy Yavid, Stony Brook, NY (US); Mykola Rabchevskiy, Ewing, NJ (US)

( * ) Notice: Subject to any disclaimer, the term of this patent is extended or adjusted under 35 U.S.C. 154(b) by 815 days.

(21) Appl. No.: 17/340,154

(22) Filed: Jun. 7, 2021

Related U.S. Application Data

(63) Continuation-in-part of application No. 15/966,193, filed on Apr. 30, 2018, now Pat. No. 11,031,885.
(60) Provisional application No. 62/501,137, filed on May 4, 2017.

(51) Int. Cl.
*H02N 2/18* (2006.01)
*F42C 11/00* (2006.01)
*H02K 35/02* (2006.01)

(52) U.S. Cl.
CPC ............ *H02N 2/185* (2013.01); *H02K 35/02* (2013.01); *H02N 2/188* (2013.01); *F42C 11/008* (2013.01)

(58) Field of Classification Search
CPC ........ H02N 2/185; H02N 2/188; H02K 35/02; F42C 11/008
See application file for complete search history.

(56) References Cited

U.S. PATENT DOCUMENTS

| | | | | |
|---|---|---|---|---|
| 4,005,319 A * | 1/1977 | Nilsson | ............... | H10N 30/306 |
| | | | | 102/210 |
| 7,696,673 B1 | 4/2010 | Yavid | | |
| 9,590,534 B1 | 3/2017 | Yavid | | |
| 11,329,575 B2 * | 5/2022 | Karasikov | ............... | B64C 13/50 |
| 2005/0016408 A1 * | 1/2005 | Smith | ............... | F42C 15/295 |
| | | | | 102/225 |
| 2005/0188885 A1 * | 9/2005 | Daigle | ............... | F42B 12/42 |
| | | | | 102/502 |
| 2024/0053128 A1 * | 2/2024 | Binns | ............... | F42C 15/295 |

OTHER PUBLICATIONS

Recent Progress in Piezoelectric Conversion and Energy Harvesting Using Nonlinear Electronic Interfaces and Issues in Small Scale Implementation, Daniel Guyomar and Mickaël Lallart, Micromachines 2011, 2(2), 274-294; doi:10.3390/mi2020274.

Speck-Size Computers: Now With Deep Learning Michigan labs' "micromotes" aim to make the IoT smarter, by Katherine Bourzac, Spectrum Apr. 2017 pp. 13-15.

* cited by examiner

*Primary Examiner* — J. San Martin
(74) *Attorney, Agent, or Firm* — Donald J. Ersler

(57) ABSTRACT

An electric power generator for a projectile moving through the air is based on vibrational, rather than rotational motion. The electric power generator uses an air stream through, which the projectile is traveling typically 100-250 m/s for mortars to up to 1,500 m/s for sabot or even higher electrically fired rounds. A typical 223 rifle round after being fired has energy of over 1700 J, which is equivalent to 1700 W seconds. If a Nano computer was able to extract energy of for example 50 nanowatts during bullet flight which rarely exceeds two seconds the power needed during the flight would be only a few parts per billion of the bullet's energy. Even allowing for very inefficient extraction of power, the necessary power to operate on onboard electronic devices such as computers and sensors can be extracted from the airstream through which the projectile travels.

16 Claims, 16 Drawing Sheets

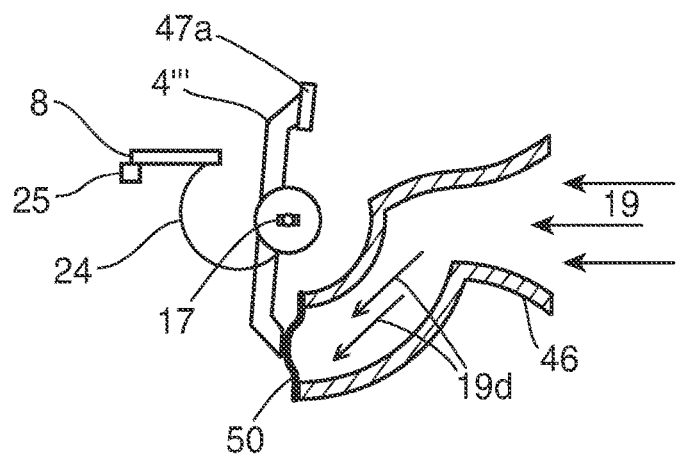
FIG. 19A
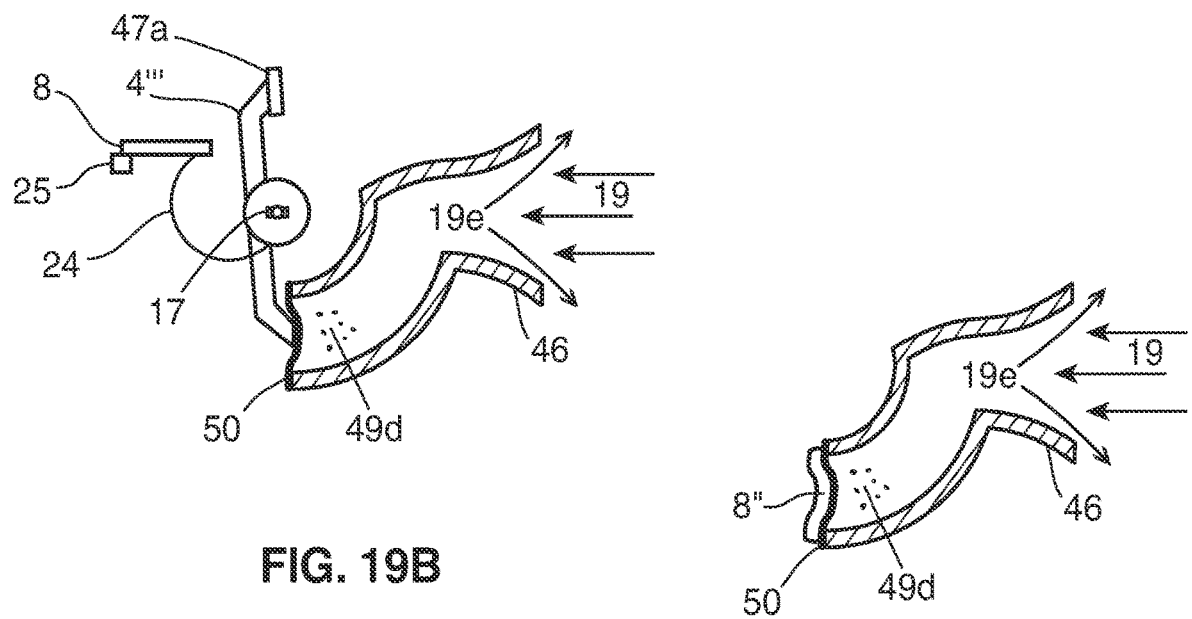
FIG. 19B
FIG. 20

ELECTRIC POWER GENERATOR FOR A PROJECTILE MOVING THROUGH THE AIR

BACKGROUND OF THE INVENTION

1. Cross-References to Related Applications

This is a continuation-in-part patent application, which takes priority from patent application Ser. No. 15/966,193, filed on Apr. 30, 2018, which claims the benefit of provisional application No. 62/501,137 filed on May 4, 2017.

2. Field of the Invention

The present invention relates generally to projectiles and more specifically to an electric power generator for a projectile moving through the air based on vibrational, rather than rotational motion.

3. Discussion of the Prior Art

Historically electrical power has been needed for radar fusing shells and mortars, which typically have used batteries where the electrolyte has been stored separately from the battery plates. During firing from a gun or mortar tube, the acceleration has released the electrolyte into the battery to generate current for powering the radar unit forming part of the fuse. Recent developments in miniaturizing electrical components such as computers, memory, sensors, and radio transmitters have been developed for the Internet of things. Computers can now be made as small as one cubic millimeter. These nano-scale devices can be designed to use only a few nano watts of power to perform tasks such as distinguishing the sound of a passing car, or measuring temperature and light. Recent Progress in Piezoelectric Conversion and Energy Harvesting Using Nonlinear Electronic Interfaces and Issues in Small Scale Implementation, Daniel Guyomar and Mickasl Lallart, Micromachines 2011, 2(2), 274-294; doi:10.3390/mi2020274 which is incorporated herein by reference. Speck-Size Computers: Now With Deep Learning Michigan labs' "micromotes" aim to make the IoT smarter, by Katherine Bourzac, Spectrum April 2017 pages 13-15

Modern projectiles need electric power to supply fuses, sensors, guidance systems and other electric devices. Power generators harvesting energy from the ambient air flow are known in the art and possess serious advantages over batteries and other chemical storage sources, such as continuous availability of power as long as the projectile flies and nearly unlimited shelf life. Most air flow harvesting generators make use of a rotational air turbine.

Accordingly, there is a clearly felt need in the art for an electric power generator for a projectile moving through the air based on vibrational, rather than rotational motion. The advantages include smaller size and lower cost, mainly due to lack of bearings, and suitability for Micro-Electro-Mechanical System (MEMS) implementation, which is especially important to small-caliber projectiles.

SUMMARY OF THE INVENTION

The present invention provides an electric power generator for a projectile moving through the air based on vibrational, rather than rotational motion. The electric power generator for a projectile uses an air stream through, which the projectile is traveling typically 100-250 m/s for mortars to up to 1,500 m/s for sabot or even higher electrically fired rounds. A typical 223 rifle round after being fired has energy of over 1700 J, which is equivalent to 1700 W seconds. If a Nano computer was able to extract energy of for example 50 nanowatts during bullet flight which rarely exceeds two seconds the power needed during the flight would be only a few parts per billion of the bullets energy. Even allowing for very inefficient extraction of power, the necessary power to operate on onboard electronic devices such as computers and sensors can be extracted from the airstream through which the projectile travels. The present invention utilizes either a passageway extending through the projectile from an inlet having a first stagnation pressure to an outlet having a second and lower stagnation pressure such that fluid is caused to flow along the passage. The passage a section in which a power generating devices located which may be enlarged as necessary to contain the power generating device. The first embodiment utilizes a magnetic containing rudder pivotally mounted in the flow passage, which is made to oscillate by the fluid traveling over both surfaces of the rudder. The air passing over the rudder surfaces being inherently not completely symmetric will result in a lower pressure on one side versus the other such that the relevant rudder will pivot towards the low-pressure side of the rudder and toward the wall of the passageway which will reduce air velocity on the low-pressure side due to the Bernoulli's principle will now have a higher pressure and so oscillate away from the wall. The moving magnet positioned between one or more coils or other electromotive devices will cause a current to flow providing electrical power.

In an alternative embodiment, a valve is constructed in the passageway in the valve stem which closes the passageway directly or is linked to a moving member mounted to piezoelectric element to generate electrical power. The valve is designed such that the stagnation pressure of the inlet will open the valve, the flow of gases through a valve opening will reduce the pressure allowing the elastic moving member, a separate elastic element or the piezoelectric element to move the valve stem, preferentially arranged to form a needle valve, to momentarily close the valve. Thus, the opening and closing of the valve will cause the moving member and the piezo-electric member linked to there to oscillate. In a further embodiment energy, may be stored and used to actively open and close the valve using a piezoelectric actuator connected to the valve stem.

In further embodiments energy is gathered from fluid flow on the exterior envelope of the projectile, preferably symmetrically to minimize any effect to the trajectory of the projectile. Energy gathering devices are positioned behind flow control members, which may for instance shed vortices to produce an oscillating pressure field on piezoelectric elements. In a further external embodiment the flow control members are implemented as a balanced rudders i.e., a rudder in which the axis of rotation of the rudder is behind its front edge, and preferably be centered to create an unstable rudder which will constantly vary the pressure on the piezoelectric elements, which can be called to resonate by mounting a balanced rudder to a torsion spring on one side of which is anchored which would create a resonant system that would drastically increase the amplitude of the oscillation of the air pressure flow or rate.

Another embodiment controls the movement of the balanced rudder with an opening in the plate, which is mechanically or electrically oscillated so that the opening is positioned first on one side than on the other side of the pivot of the rudder. This can be further elaborated by having two plates with multiple openings which are moved relative to each other to cause the openings to open on one side and close on the other or the other way around thus alternately moving the pressure caused by the airstream from one side to the other of the pivot of the relevant rudder. A final embodiment of the invention particularly suitable for implementation in a Micro-Electro-Mechanical System (e.g. devices made using the technology developed for manufacturing integrated circuits) is where the two plates with openings are connected to flexible silicon bridges with wires formed thereon. Electrical attracting and electrical repelling forces are developed by charging and reversing the charged portions of two plates to cause movement and so to open and close the opening through the plates.

Accordingly, it is an object of the present invention to provide an electric power generator for a projectile moving through the air based on vibrational, rather than rotational motion.

Finally, it is another object of the present invention to provide advantages, such as a smaller size and lower cost, mainly due to a lack of bearings, and suitability for Micro-Electro-Mechanical System (MEMS) implementation, which is especially important to small-caliber projectiles.

These and additional objects, advantages, features and benefits of the present invention will become apparent from the following specification.

BRIEF DESCRIPTION OF THE DRAWINGS

FIG. 19A is a cross sectional view of an embodiment employing a resonant air chamber with no exit opening, instead terminated with a flexible membrane, shown at a point of a rotational oscillatory cycle of a moving element with a membrane maximizing a size of a chamber.

FIG. 19B is a cross sectional view of FIG. 19A, shown in at an opposite end point of a cycle with a membrane minimizing a size of a chamber.

FIG. 20 is a cross sectional view of an embodiment employing a resonant air chamber with no exit opening, terminated with a membrane of sufficient rigidity to act as a combination of a moving member and a spring, and having its own resonant frequency close to an acoustic resonant frequency of a chamber.

DETAILED DESCRIPTION OF THE PREFERRED EMBODIMENTS

Figure 1:
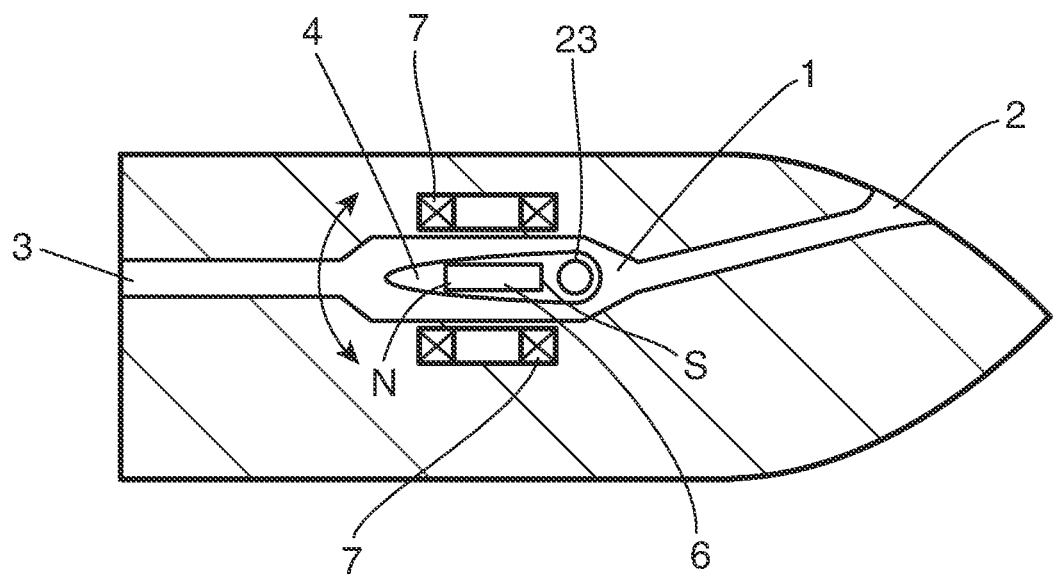
FIG. 1 is a cross sectional view of an embodiment of the present invention with an electro-magnetic machine and no air flow control member.

A preferable embodiment is shown in FIG. 1. In this embodiment, a moving member 4 is supported by a torsional spring 23, which allows it to move angularly, in a direction perpendicular to the air flow, as shown. As it moves closer to one wall of the air chamber 1 and further from the other, it alters the air flow around itself, thus supporting self-sustained vibration, hence a separate air flow control member is not needed. The electric machine is formed by the magnet 6 embedded in the moving member and coils 7 positioned outside of the air chamber 1, the angular motion of the magnet causing variable magnetic flux in the coils and thus inducing voltage across their windings.

Figure 2:
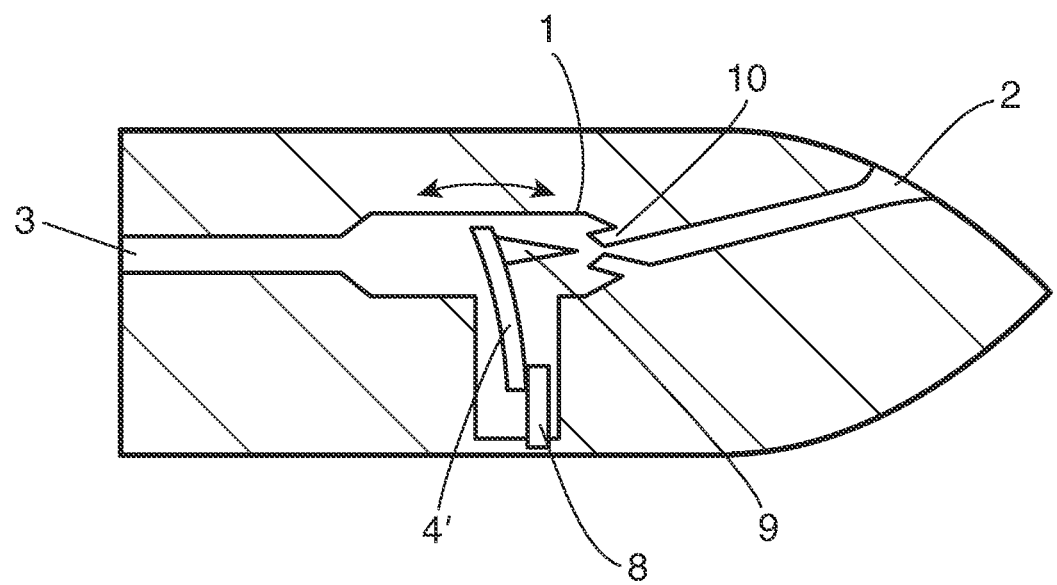
FIG. 2 is a cross sectional view of an embodiment of the present invention with a piezo-electric element and a rigidly attached valve.

FIG. 2 shows an alternative embodiment, where a moving member 4' is a bending flexure, vibrating in the direction of the air flow. The air flow control member takes a form of a needle valve 9, rigidly connected to the moving member 4' and engaging seat 10, thus altering the air flow and supporting self-sustained vibration of the moving member 4'. The electric machine includes the piezoelectric element 8, having one end attached to the moving member 4' and the other end to the body of the projectile. The motion of moving member 4' deforms the piezoelectric element 8, the latter generating an electric charge in response.

Figure 3:
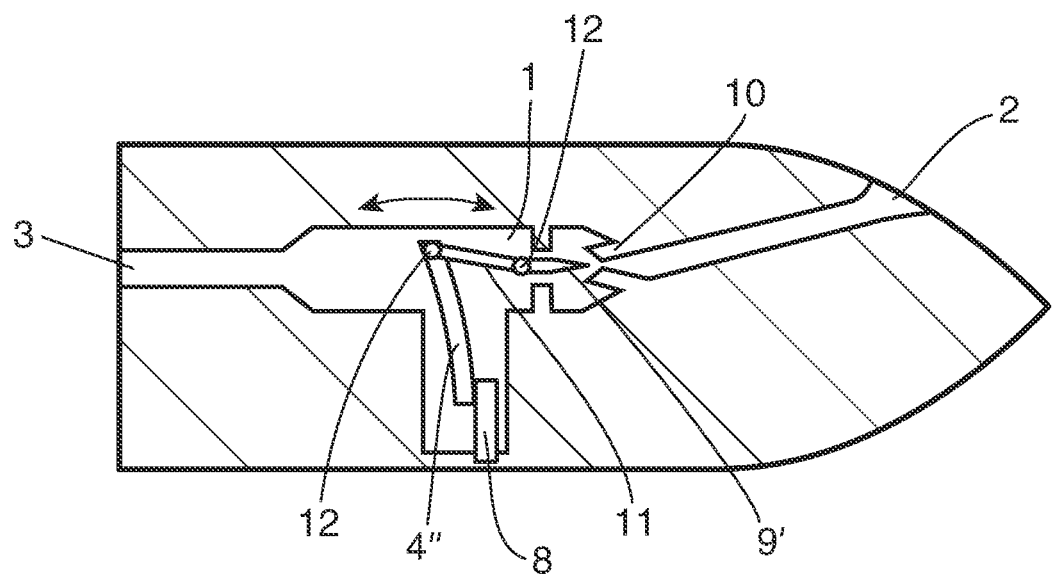
FIG. 3 is a cross sectional view of an embodiment of the present invention with a piezo-electric element and mechanically-linked valve.
Figure 4:
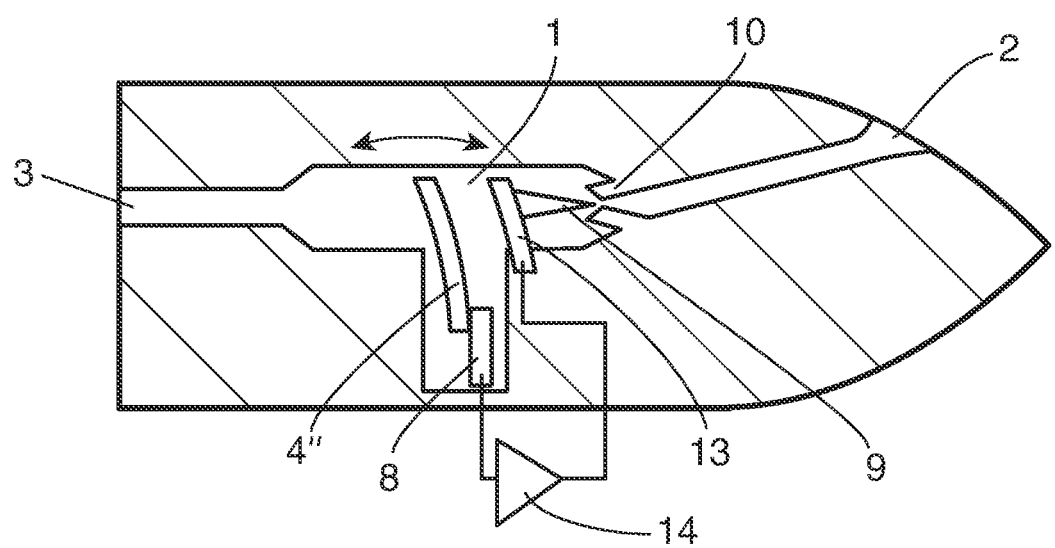
FIG. 4 is a cross sectional view of an embodiment of the present invention with a piezo-electric element and an electronically-linked valve.

Yet another alternative embodiment is presented in FIG. 3. The air flow control member formed by a needle valve 9' and a seat 10, is removed from the moving member 4" and mechanically linked to the moving member 4" with a lever 11, connected to both the needle valve 9' and the moving member 4" with torsional flexures 12. FIG. 4 shows a similar embodiment, where the mechanical linkage 11 is replaced by electronic synchronization between moving member 4" and needle valve 9, the latter being driven by another piezoelectric element 13, which is energized through an electronic controller 14.

Figure 5:
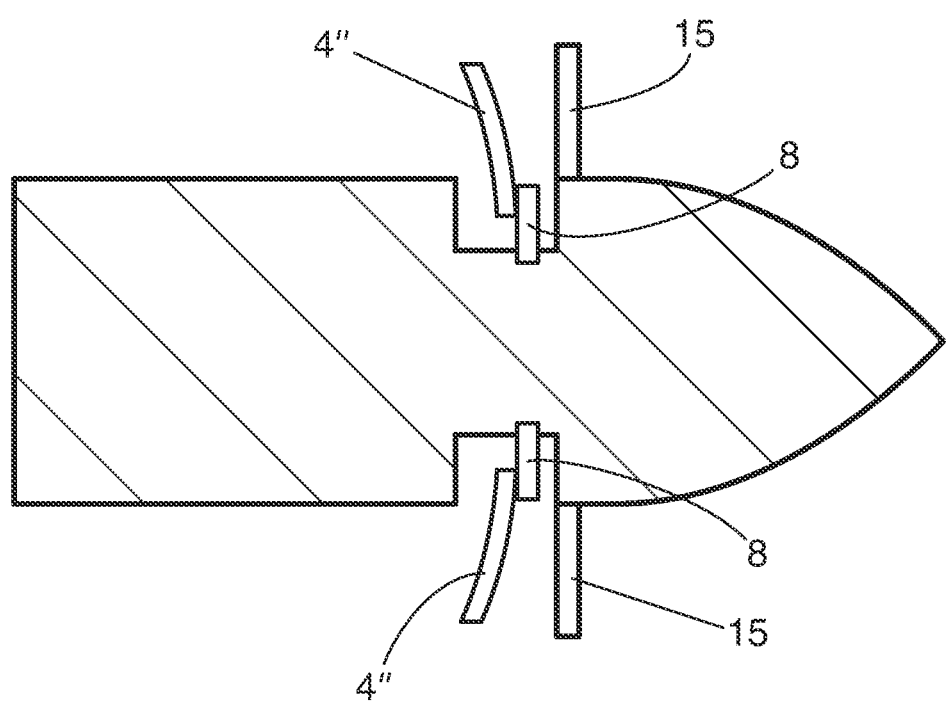
FIG. 5 is a cross sectional view of an embodiment of the present invention with moving members extending out of a projectile.

With reference to FIG. 5, a moving member 4" is exposed to air flow and extends out of the projectile, rather than being positioned within the air chamber inside the projectile. Moving members 4" are attached to the piezoelectric elements 8 and installed symmetrically on both sides of the projectile. Flow control members 15 are protruding outside of the projectile as well. Furthermore, the moving members 4" and flow control members 15 may be foldable, unfolding after the firing of the projectile.

Figure 6:
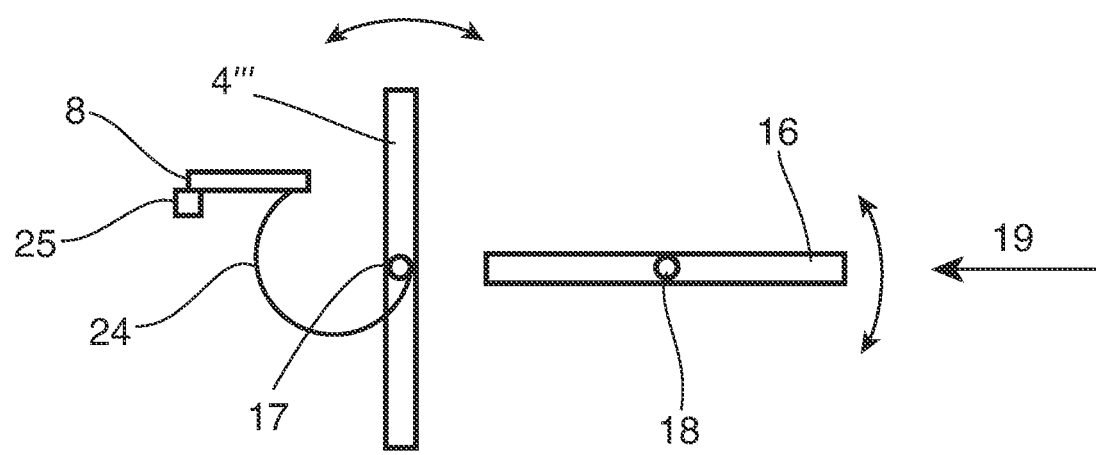
FIG. 6 is a side view of an embodiment of the present invention with a balanced rudder as an air flow control member, and a torsional spring.

FIG. 6 further details another embodiment with moving member 4'" and flow control member 16 protruding outside of the projectile. In this case, the flow control member 16 is implemented as a balanced rudder pivoting around an axle 18, and directing the incident air flow 19 to one or the other side of the moving member 4'", pivoting around an axle 17. It may be advantageous, although not strictly necessary, to have the moving member 4'" coupled to a torsional spring 24, the other end of which is connected to the piezoelectric element 8 and the piezoelectric element 8 in turn attached to a stationary anchor point 25. The torsional spring 24 would make the moving member 4'" a part of highly-resonant system, thus drastically increasing the amplitude of its oscillations at any given air flow pressure or rate. All other embodiments of the present invention can benefit from resonant properties of the moving member 4'". The movement of the flow control member 16 is controlled, mechanically or electronically, to be synchronous to the movement of the moving member 4'", thus promoting continuous resonant oscillations of moving member 4'". The power of these oscillations can be partially harvested by magnetic or piezoelectric electrical machine (not shown).

Figure 7:
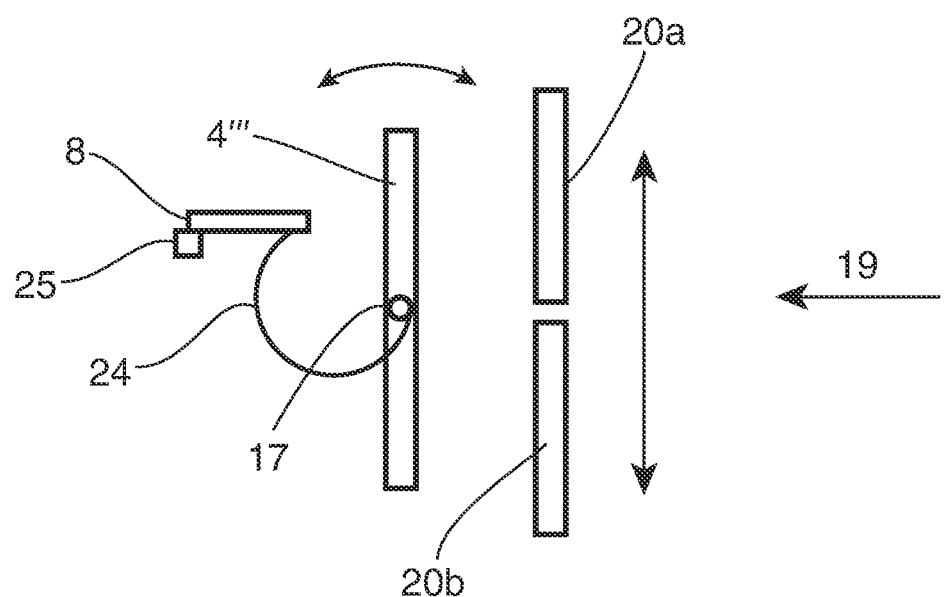
FIG. 7 is a side view of an embodiment of the present invention with a laterally-moving plate as an air flow control member.

Another embodiment uses a plate 20, moving laterally between end positions 20a and 20b, as shown in FIG. 7. As in the previously discussed embodiment, the movement of the plates 20a and 20b are controlled, mechanically or electronically, to be synchronous to the movement of the moving member 4'", thus promoting its continuous resonant oscillations. As in FIG. 6, the power of resonant oscillations is transmitted by the spring 24 to the piezoelectric element 8 attached to a stationary anchor point 25.

Figure 8A:
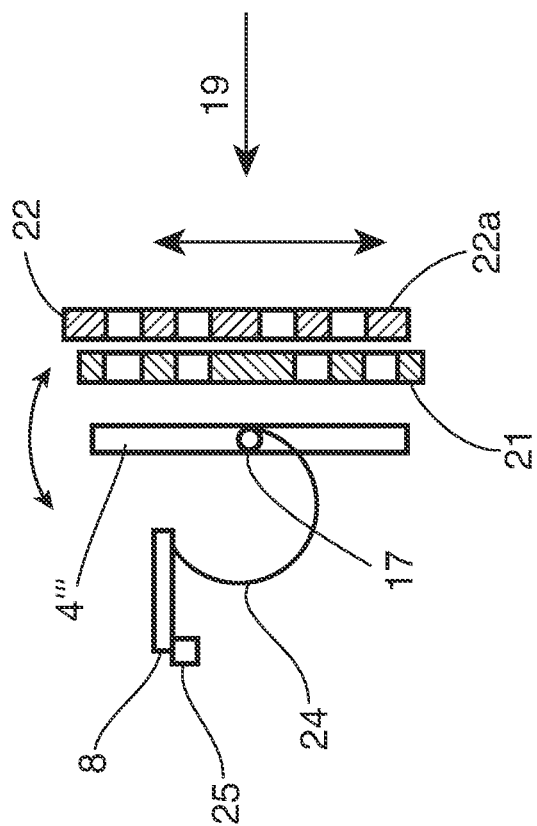
FIG. 8A is a side view of an embodiment of the present invention with a stationary and laterally-moving perforated plates as an air flow control member with perforations aligned on a bottom side of the plates.
Figure 8B:
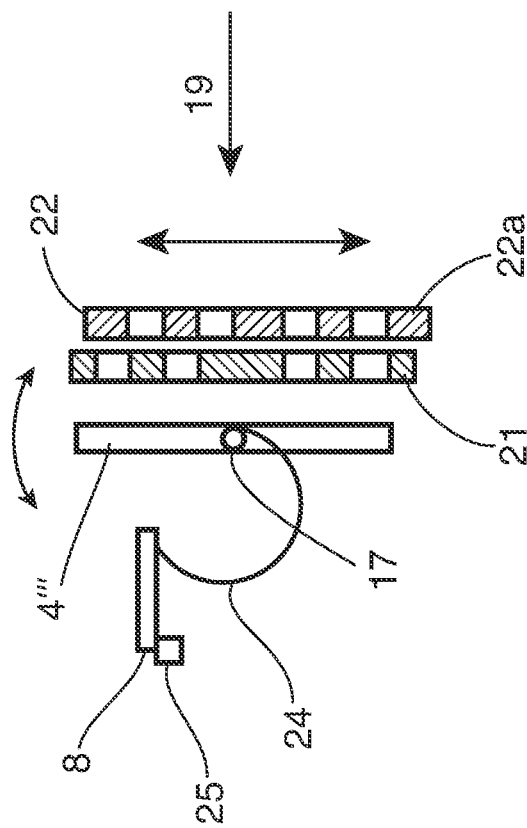
FIG. 8B is a side view of an embodiment of the present invention with a stationary and laterally-moving perforated plates as an air flow control member with perforations aligned on a top side of the plates.

A further enhancement of this embodiment is illustrated in FIGS. 8A and 8B. The flow control element here includes a stationary perforated plate 21 and a moving perforated plate 22, with two end positions 22a and 22b shown in FIGS. 8A and 8B respectively. When the perforations of the plate 21 and 22 are aligned as shown on FIG. 8A, the air flow pressure will be disproportionally applied on the bottom side of the moving member 4'", thus forcing it to pivot clockwise. Correspondingly, when the perforations of the plate 21 and 22 are aligned as shown on FIG. 8B, the air flow pressure will be disproportionally applied on the top side of the moving member 4'", thus forcing it to pivot counterclockwise. The advantage of this embodiment is in the relatively short stroke required for the moving plate 22. As before, the power of resonant oscillations is transmitted by the spring 24 to the piezoelectric element 8 attached to the stationary anchor point 25.

Figure 9A:
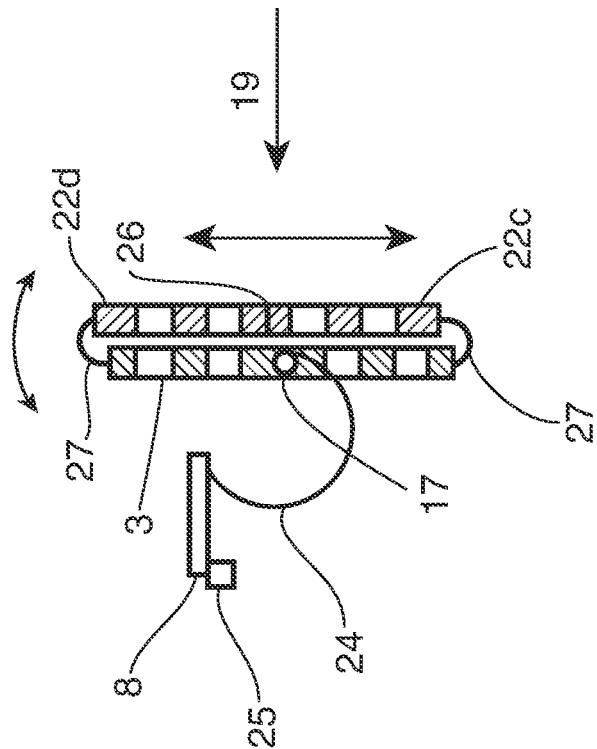
FIG. 9A is a side view of an embodiment of the present invention where the moving member and the air flow control member are integrated and fabricated using MEMS technology with perforations aligned on a bottom side of the plates.
Figure 9B:
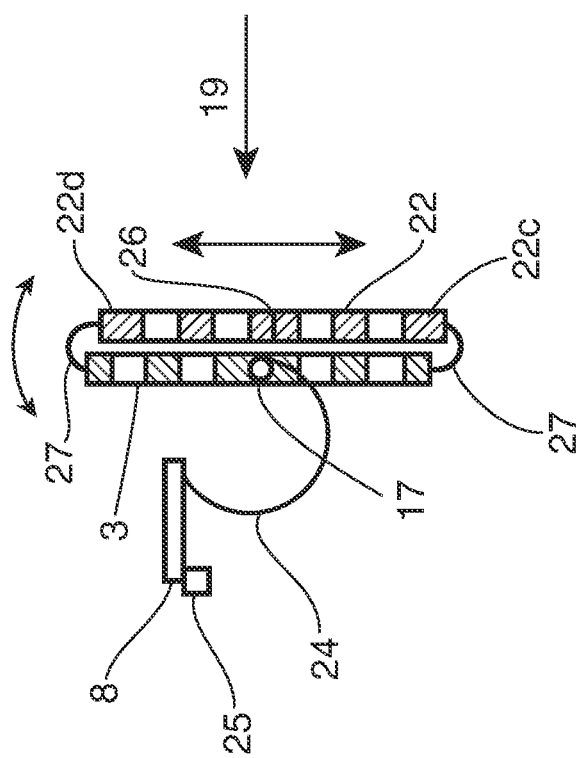
FIG. 9B is a side view of an embodiment of the present invention where the moving member and the air flow control member are integrated and fabricated using MEMS technology with perforations aligned on a top side of the plates.

FIGS. 9A & 9B depict an embodiment that is particularly suitable for MEMS implementation, where a flow control member, in the form of the perforated plate 22, is integrated with a moving member 3, which is itself a perforated plate. The moving member 3 and the flow control member 22 are preferably made from a single silicon wafer that is subsequently diced. They are connected together by flexures 27, preferably also made from silicon and carrying electrical conductors (not shown), which deliver positive charges to the top half of the perforated plate 22d, and negative charge to the bottom half of the perforated plate 22c. To be able to maintain charges of opposite polarity, the top and bottom halves 22c and 22d of the perforated plate 22 are separated by the isolation barrier 26. Subsequent application of either positive or negative charge to the moving member 3 induces attraction between the moving member 3 and either the bottom half 22c, as shown in FIG. 9A and FIG. 9B respectively.

Consequently, the air pressure builds up on the side where the openings in the moving element 3 and perforated plate 22 are not aligned, thus producing torque in CCW direction in the position shown in FIG. 9A, or in CW direction in the position shown in FIG. 9B. Under the action of this variable torque, the moving member and the perforated plate are rotating together around the axle 17, which may, in turn be connected to the torsional spring 24, forming a resonant system, as in other embodiments. As before, the power of resonant oscillations is transmitted by the spring 24 to the piezoelectric element 8 attached to a stationary anchor point 25.

Figure 10:
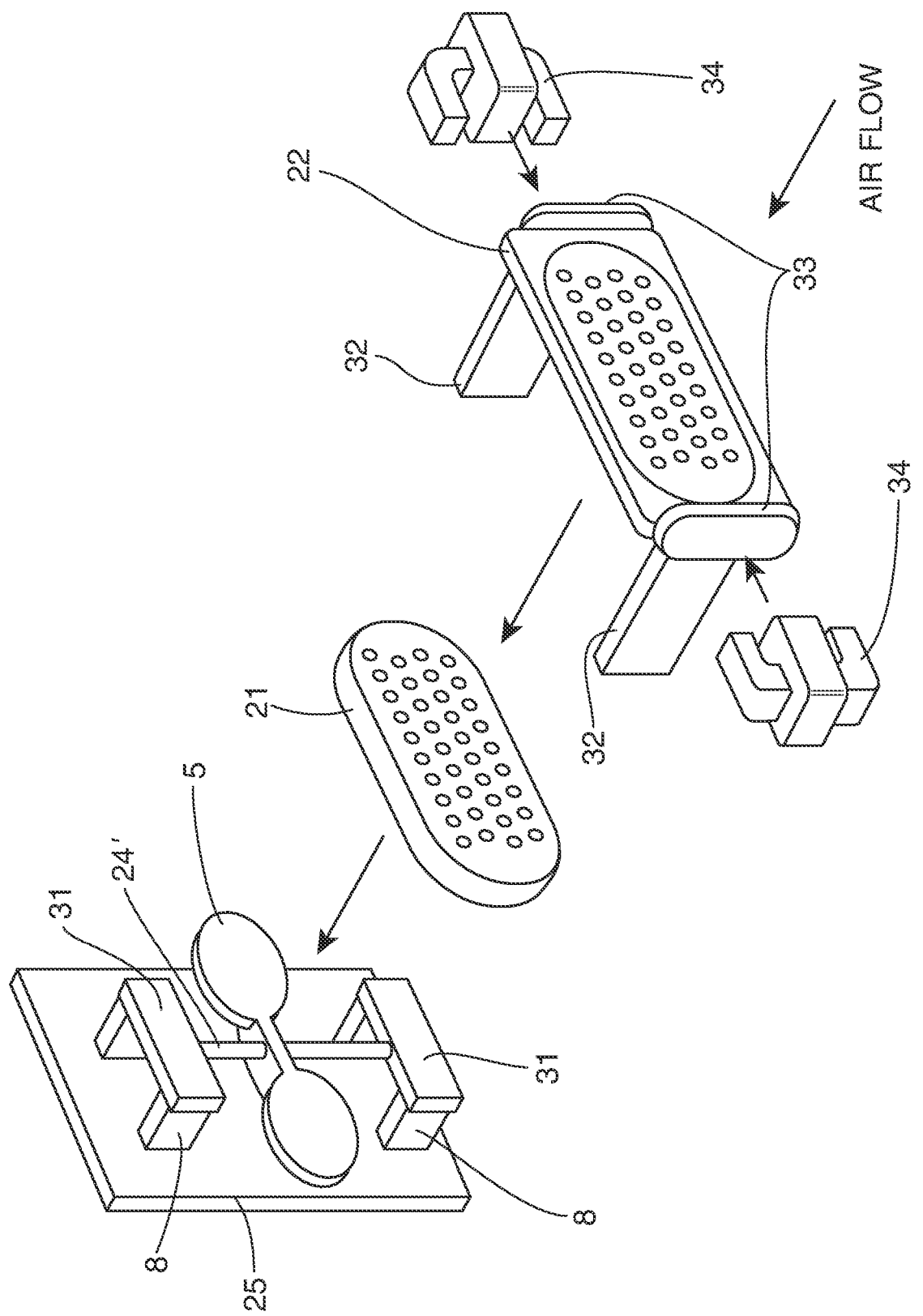
FIG. 10 is a perspective view of an embodiment of the present invention, which shows an air flow control member driven by magnetic method, rather than an electrostatic method.

Alternatively, the air flow control member may be driven by magnetic, rather than electrostatic method. Such embodiment is depicted in FIG. 10. The moving member 5 is mounted on a torsional spring 24', which is preferably a hollow shaft made of carbon steel, beryllium copper, or other strong spring material. The ends of the shaft are embedded into cross-bars 31, which in turn are mounted on four compression-mode piezo electric elements 8'. The other ends of piezo elements are anchored to a stationary base 25, with electrical connections provided by the base 25 as well. Stationary plate 21 is also rigidly connected to the base 25, and may be made of solid metal or plastic, as it doesn't have to be light-weight. Contrary, the moving plate 22' needs to be light-weight, so it is preferably made as a thin perforated membrane supported by a frame. The moving plate 22' is mounted on leaf springs 32, that allow it enough side-to-side motion to change the alignment of the perforations on the left and right halves of the perforated plates. The actuation of this side-to-side motion is provided by iron plates 33, mounted on the sides of the plate 22, and interacting with solenoids 34. In operation, the solenoids 34 are turned on and off in opposite phases, at the frequency equal to the resonant frequency of the oscillator formed by the moving member 5 and the torsional spring 24'. The alignment of the perforated plates 21, 22' changes at the same frequency, thus directing the air flow to either left or right parts of the moving member 5 and exciting its resonant oscillations.

The piezo elements 8' expand and contract under pressure from the cross-bars 31, thus generating energy in every cycle, while the air flow replenish its energy. Energy thus generated is then collected into a capacitor by a diode rectifier (not show), and can be used for electrical consumption. The operation of this embodiment requires a control circuit that drive solenoids in sync with the oscillations of the moving member 5, which is achieved by synchronizing this circuit with the voltage generated by the piezo elements 8'.

Figure 11:
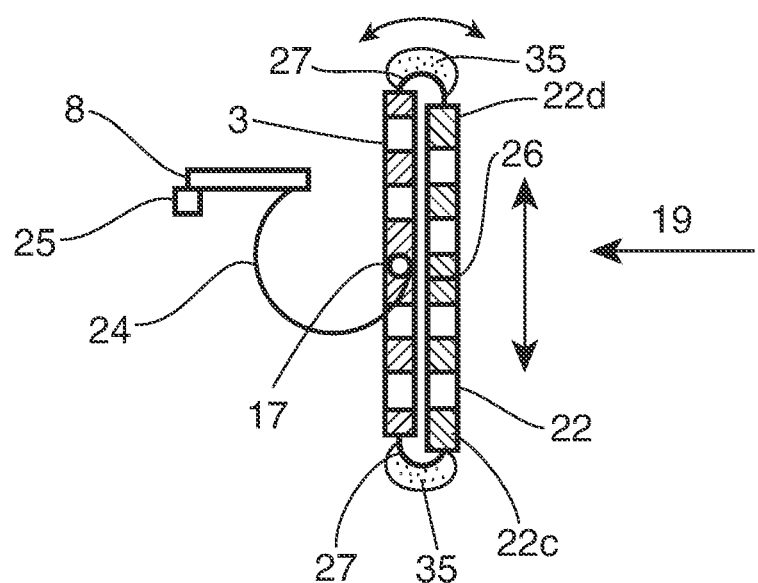
FIG. 11 is a side view of an embodiment of the present invention, which makes it possible to avoid using an active electronic synchronization between a moving member an air flow control member.

It may also be possible to avoid using an active electronic synchronization between the moving member 5 and the air flow control member, if they are mechanically linked in such a way that maintains the correct phase relationship between their movements. Such implementation is shown on FIG. 11, which adds mechanical dampers 35 to the flexures 27. Preferably, the resonant frequency of the system formed by the mass of the perforated plate 22c, 22d and the stiffness of the flexures 27 is closed to the torsional resonant frequency of the moving member 3. In the absence of dampers, the resonant oscillations of both systems would be unlikely to synchronize, leading to beat pattern between their oscillations and changing phase relationship, with little or no generated power. However, with dampers reducing the quality factor of each system and increasing coupling between them, the synchronization can be established, and the phase shift made constant and close to 90 degrees, which is conducive to generating maximum energy from the air flow. The dampers 35 may take a form, for example, of a layer of a material with high mechanical loss, such as soft plastic or rubber, or dry friction pads.

Figure 12A:
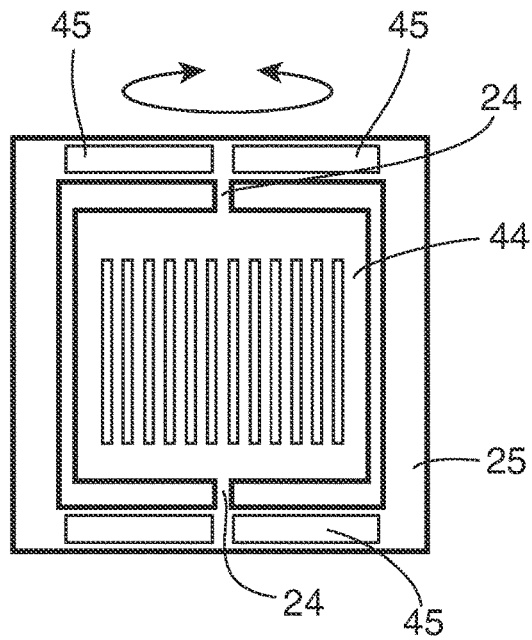
FIG. 12A is a front view of an embodiment of the present invention, which includes a base, piezo electric elements, a slotted plate and torsion springs, which engage the slotted plate with the base.
Figure 12C:
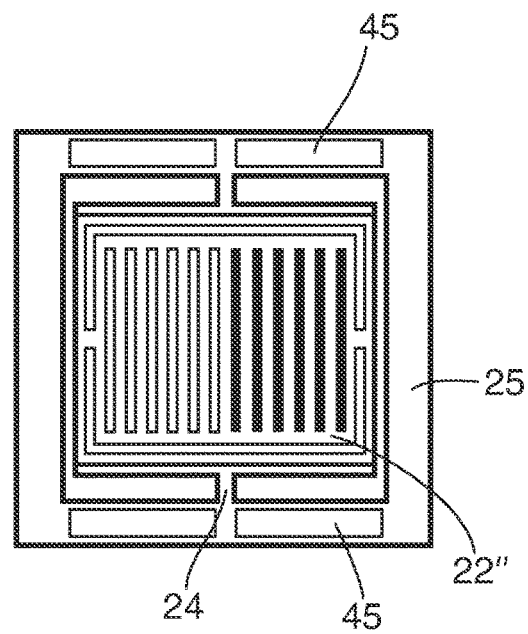
FIG. 12C is a front view of an embodiment of the present invention, which illustrates an SoI wafer placed on a base plate with air flow slots obstructed on a right side thereof.
Figure 12B:
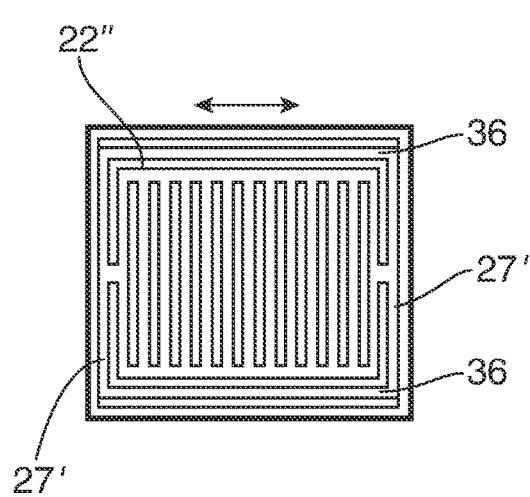
FIG. 12B is a front view of an embodiment of the present invention, which illustrates a silicon-on-insulater (SoI) wafer attached to a base layer by unreleased interlayer bond lines and contains a slotted plate and flexures that allow the slotted plate to move laterally with respect to a base plate.
Figure 12D:
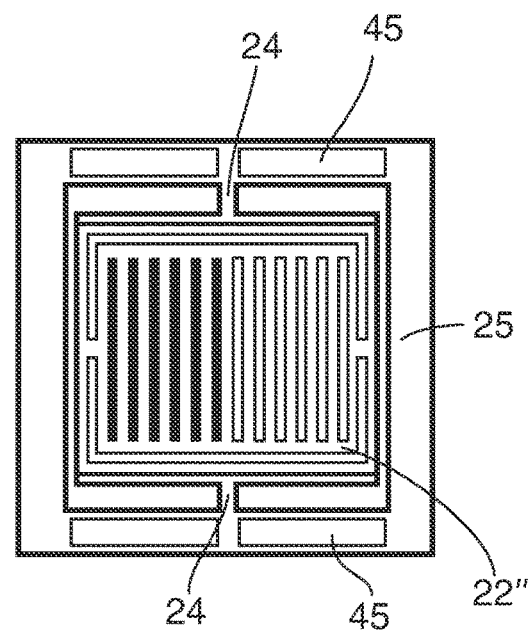
FIG. 12D is an embodiment of the present invention, which illustrates an SoI wafer placed on a base plate with air flow slots obstructed on a left side thereof.

With reference to FIGS. 12A-12D, this embodiment is also expressly conducive to MEMS implementation using a silicon-on-insulator (SoI) wafer. The base layer of the wafer, shown on FIG. 12A, contains the base frame 25, a torsional spring 24" and a moving slotted plate 44. Piezo elements 45 are deposited by Sol-Gel process. The SOI layer, depicted on FIG. 12B is attached to the base layer by unreleased interlayer bond lines 36, and contains the other slotted plate 22 and the flexures 27', that allow the plate 22" to move laterally with respect to plate 44. The end positions of such movement are depicted on FIGS. 12C and 12D, illustrating the change in open cross-section of left and right halves of the device, and respectively, their changing air flow resistance. The masses of both plates and the spring constants of the torsional spring 24" and flexures 27' are chosen in such a way to make the frequencies of torsional and linear oscillations roughly equal. Dampers (not shown on FIG. 12) can also be added for proper synchronization and phasing.

Figure 13A:
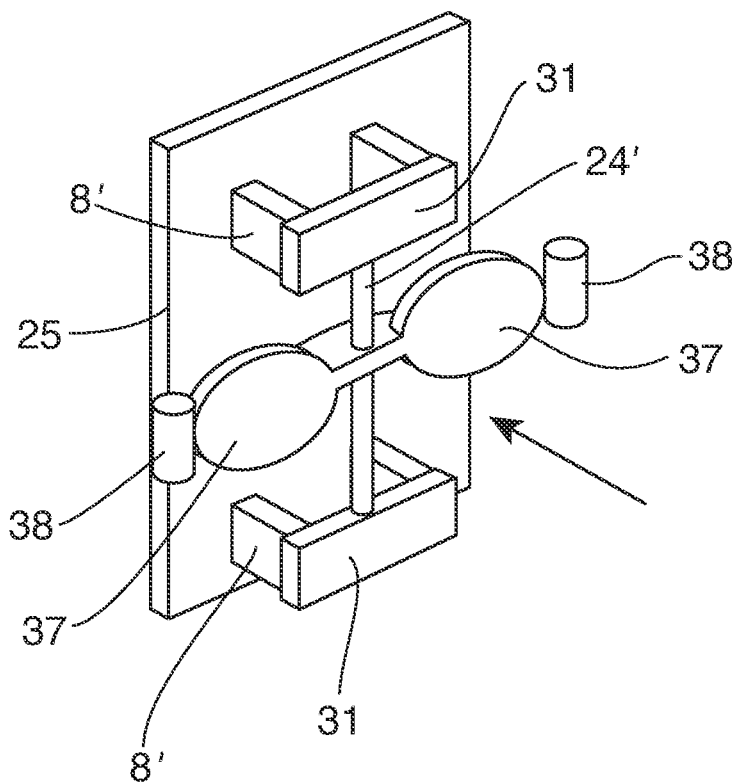
FIG. 13A is a perspective view of an embodiment of the present invention, which illustrates a single flexible moving element that performs a function of both a moving member and an air flow control member, additional masses are deposited at tips of a flexure element.
Figure 13B:
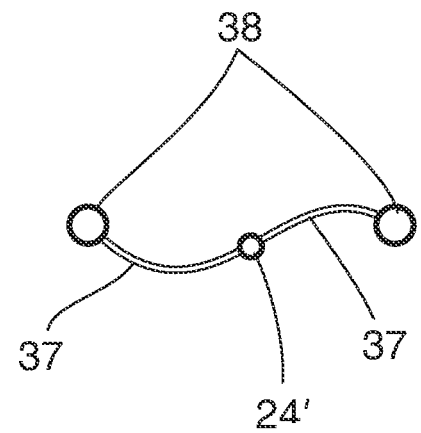
FIG. 13B is a top view of an embodiment of the present invention, which illustrates a single flexible moving element being as it under goes torsional oscillations.

Another embodiment, similar to the one depicted in FIG. 10, except that it doesn't use any electronic means of synchronization, is shown in FIGS. 13A and 13B, where a single flexible moving element 37 performs the function of both the moving member and the air flow control member. Additional masses 38 are deposited at the tips of the element 37, making it to bend, as shown in a top view in FIG. 13B, as it undergoes torsional oscillations. The motion of the additional masses 38 would always be phase-delayed with respect to the motion of the center, and by choosing the appropriate combination of mass and flexibility, it can be delayed by approximately 90 degrees of phase, so the curvature of each half of the element 37 is approximately lined up with its velocity by phase, so the surface of the element 37 always moves curvature-forward. In the presence of the external air flow, the concave side of the element 37 would present a greater resistance to it than a convex side, thus the total work of the air flow over a full cycle of oscillation would be non-zero, thus transferring some energy from the air flow to the element 37 and on to the piezo elements 8'. This effect does not depend on the direction of the air flow, or the phase of the main resonant oscillations, so some positive work would always be produced. This device may be construed as an oscillatory analog of what is known as rotating Savonius wind turbine.

Figure 14:
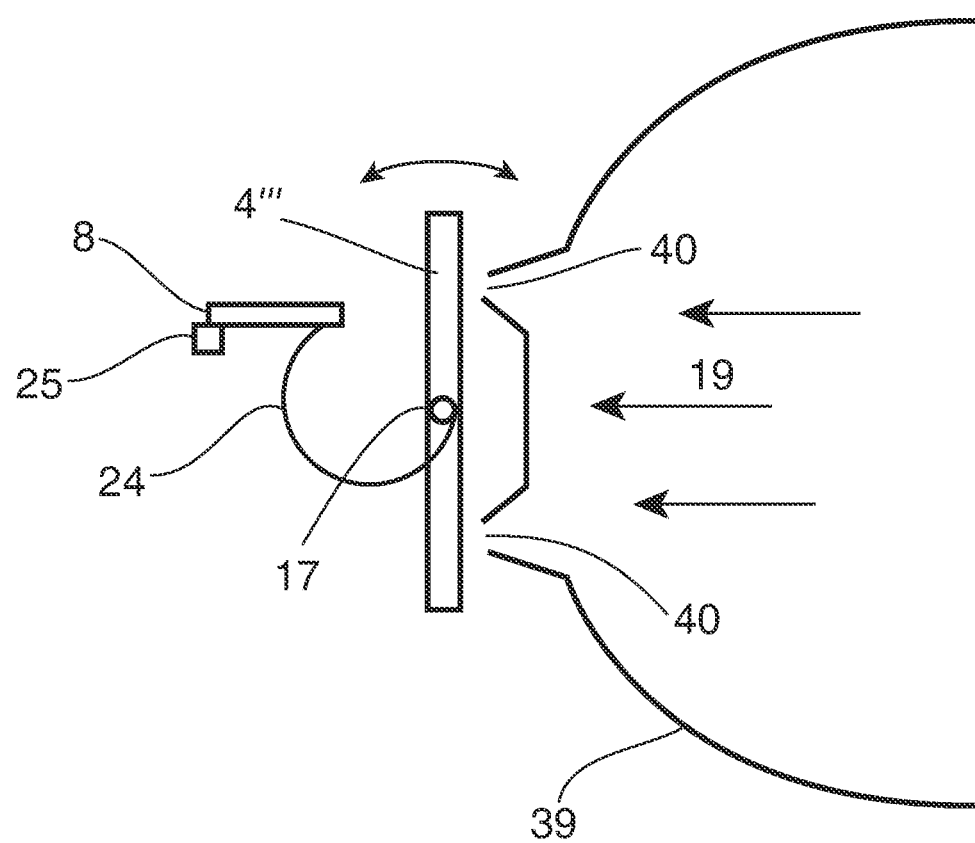
FIG. 14 is a side view of an embodiment of the present invention, which illustrates where air flow is self-controlled via resonant air box with a frequency tuned to approximately match a resonant frequency of a moving member.

Yet another embodiment is illustrated on FIG. 14, where the air flow is self-controlled via resonant air box (air chamber) 39, with the frequency tuned to approximately match the d of the moving member 4'". In this case the air pressure would build up at one of the exit openings 40, to which the moving element 4'" is closer, thus restricting the air flow. Effectively, the air flow itself participates in the torsional resonance of the moving element 4'" and therefore is synchronized with it.

Figure 15A:
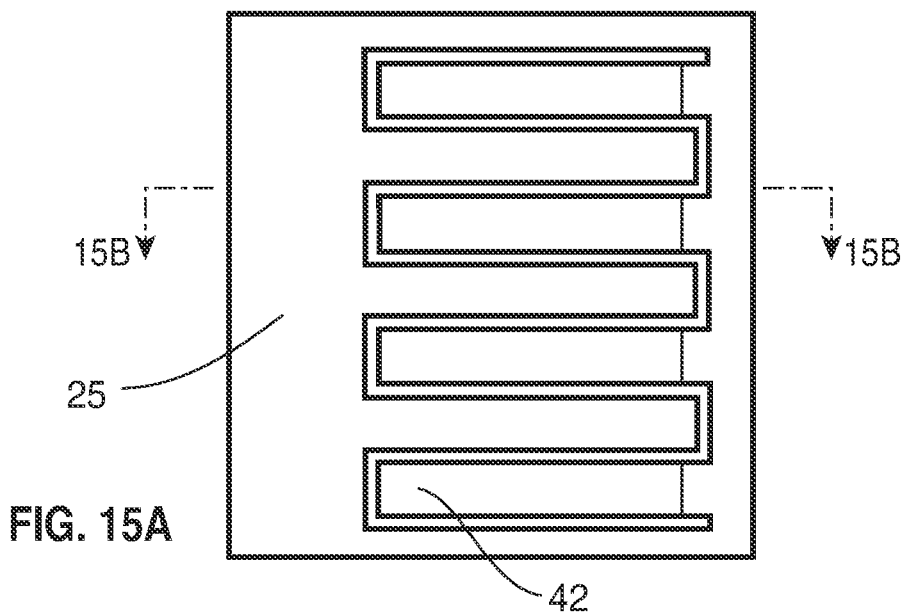
FIG. 15A is a top view of an embodiment of the present invention, which illustrates a MEMS comb-like structure is fabricated as a single piece from a silicon wafer and can be notionally divided into the stationary base on one side and a plurality of moving fingers on the other side.
Figure 15B:
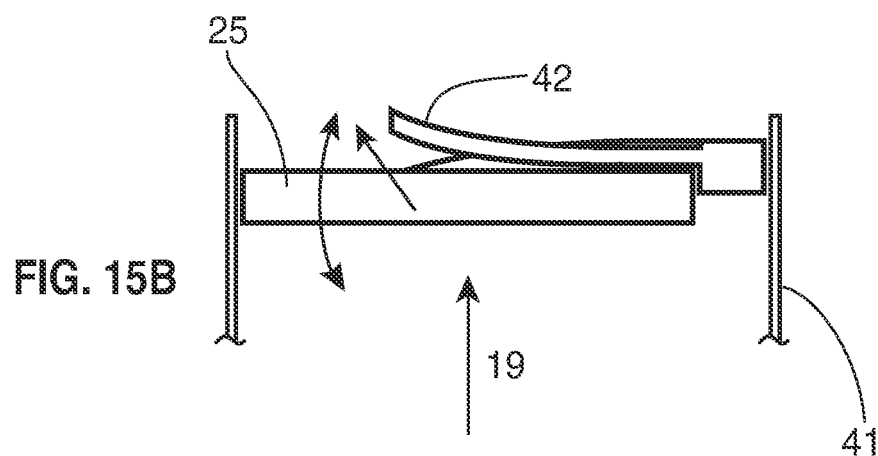
FIG. 15B is an end view of an embodiment of the present invention, which illustrates a MEMS comb-like structure is fabricated as a single piece from a silicon wafer and can be notionally divided into the stationary base on one side and a plurality of moving fingers on the other side.

A similar embodiment may also be implemented in bulk MEMS, as depicted on FIGS. 15A and 15B, by top and end views. A MEMS comb-like structure, fabricated as a single piece from a silicon wafer, can be notionally divided into the stationary base 25 on one side and the moving fingers 42 on the other side, which are offset with respect to the base. This structure is placed inside an air box (air chamber) 41. When the moving fingers move in the direction of the air flow 19, they open a passage for the air flow to escape the air box 41 (escaping air is denoted 19a), whereas moving in the opposite direction, they close the air path, leading to pressure build-up in the air box 41. Therefore, if the frequency of the air box 41 is approximately equal to the frequency of the mechanical resonance of the moving fingers 41, the air flow 19, 19a itself participates in the resonant motion of the moving fingers 42 and therefore is synchronized with it. The conversion to electricity is realized by a piezo element in-between the base part 25 of the moving fingers 42 and its support, that is not shown.

Air chambers exposed to airflow are known to have their own acoustic frequencies, generally inversely proportional to the time needed for a sound wave to travel along the chamber. Therefore, standing acoustic waves tend to form inside the chambers. This happens both when a chamber is open on both ends and there is a continuous air flow through the chamber, as in wind musical instruments, such as flute, and when only one end of the chamber is open and the air flow periodically enters and exists the chamber, as in a police whistle. Such standing acoustic waves consumes the energy of the airflow, and in their turn can provide energy to other mechanical oscillators exposed to them. Conversely, other mechanical elements that can vary the parameters of the air chamber at or near their acoustic frequencies can promote the grows of the standing acoustic waves, at the ex-pense of the energy of the airflow.

Figure 16A:
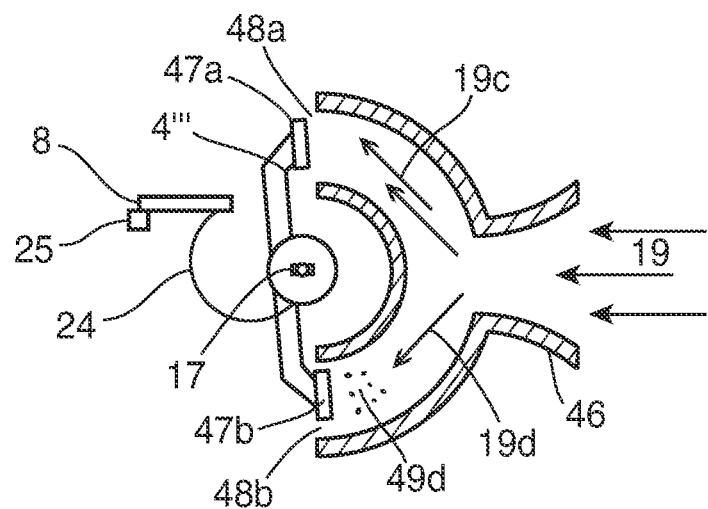
FIG. 16A is a cross sectional view of an embodiment employing a resonant air chamber with one intake opening and two exit openings, shown in one end point of a rotational oscillatory cycle of the moving element.
Figure 16B:
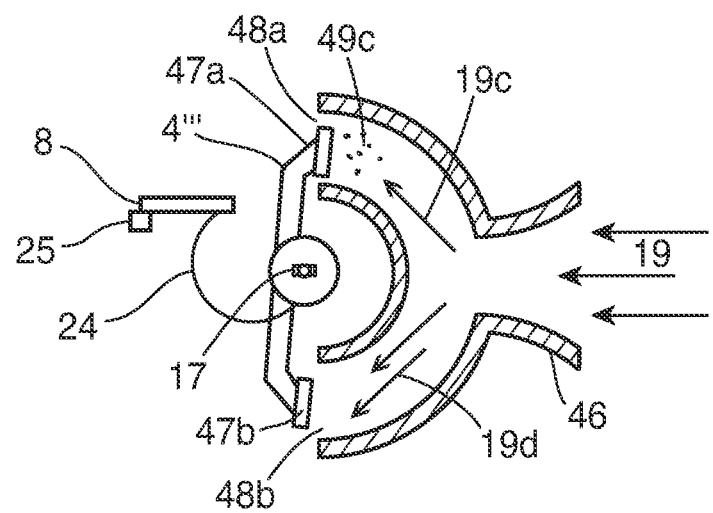
FIG. 16B is a cross section view of FIG. 16A shown in the opposite end point of the rotational oscillatory cycle.

One way of such synchronous variations has been depicted on FIG. 14, where the moving member 4''' alternatively opens and closes to exits from a generally open air box 39. A more sophis-ticated embodiment is shown on FIG. 16A, where air box 39 is replaced with an air chamber 46 of semi-toric shape, shown cross-sectionally, and the moving element 4''' is equipped with pistons 47a and 47b, shaped to move into the exit openings 48a and 48b with minimal gap between them, thus closing the respective exit, and partially displacing the air already near that exit. FIG. 16A shows the moving element 4''' in one end point, with the bulk of the air flow 19c going toward the open exit opening 48a, but some air flow 19d still moving toward the closed exit opening 48b because of the inertia. The inertial air flow 19d as well as the displacement of additional air by the piston 47b lead to the formation of a high-pressure zone 49d in front of the piston 47b, said high-pressure accelerating the back swing of the moving element 4''', into the position depicted on FIG. 16B, with a high-pressure zone 49c now forming in front of the piston 47a. This cycle then repeats indefinitely, assuming the presence of continuous air flow 19 entering the air chamber 46 from the high-pressure area in front of the projectile and exiting through the exit openings 48a and 48b connected to the low-pressure area behind the projectile. Part of the energy of that air flow will be transferred to the moving element 4''', and then to the piezo element 8, or another type of electrical machine that will convert this energy to electricity.

The condition of such stable mechanical-acoustical oscillations is that the resonant frequency of the mechanical oscillator formed by the moving element 4''' and the spring 24, and thus the periodic formation of high-pressure zones 49 at the opposite end of the chamber, should occur at or near the acoustic frequency of the chamber, thus forming a standing acoustic wave. The exact relationship between those two resonant frequencies may need to be fine-tuned for optimal efficiency. A closed-loop control system, that changes the inertia of the moving element 4''', or the rigidity of the spring can be em-ployed for such frequency tuning.

Figure 17:
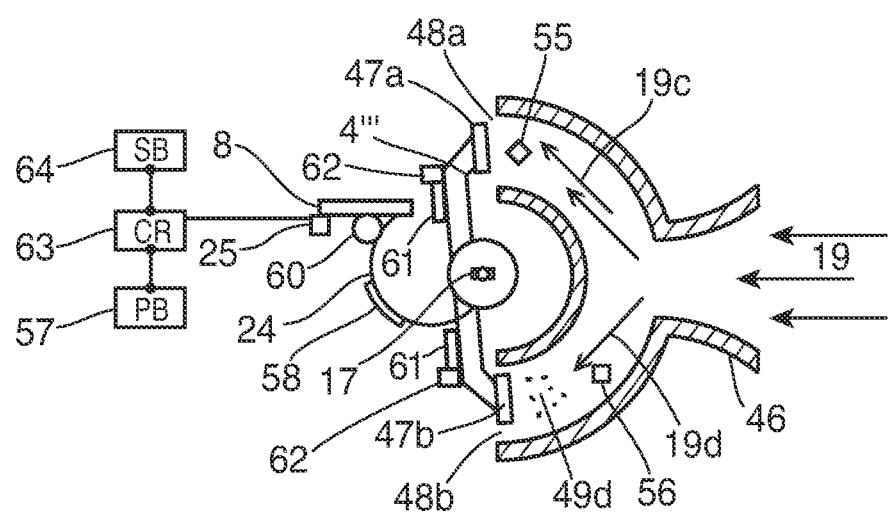
FIG. 17 is a cross sectional view of a closed-loop control system, controlling a frequency and amplitude of oscillations of a moving element.

Additionally, another closed-loop control system may be em-ployed to adjust the electrical power output of the electrical machine in order to keep the mechanical oscillations within safe amplitude. One embodiment integrating both above-mentioned closed-loop control systems is pre-sented of FIG. 17. Frequency control loop includes air pressure sensors 55 and air velocity sensors 56, which provide the information about the phase and amplitude of the acoustic oscillations in the air chamber 46. The infor-mation about the phase and amplitude of the mechanical oscillations of the moving element 4''' is collected from tension sensor 58. Additional information about the mechanical oscillations of the moving element may be collected by sensing the output voltage of the piezo element 4'''. All of this information is further analyzed by the processing block 57, which accordingly commands the angular actuator 60 to change the tension of the spring 24, and the linear actuators 61 to change the inertia of the moving element 4''' by changing the positions of masses 62, thus causing changes in the resonant frequency of the mechanical oscillations of the moving element 4''' and, respectively, the phase of those oscillations with respect to the phase of the acoustic oscillations in the air chamber 46. Note that some of the electrical wiring between the process-ing block 57 and vari-ous sensors and actuators is not shown on FIG. 17 to avoid clut-ter, however the processing block 57 is assumed to be connected to all other above-mentioned elements of the control systems.

Not all of the above-mentioned sensors and actuators may be necessary, and some of them may combine both func-tions. For example, a tension sensor 58 may be made as a thin piezo-electric element adhesively attached to the spring 24, in which case it may act as both tension sensor and tension changer when external voltage is applied to it.

Additionally, the processing block 57 controls the con-trollable rectifier 63, and thus may change the electric current taken from the piezo element 8. Additional electric current taken from the piezo element 8 increases mechanical losses in the resonant oscillator formed by the moving element 4''' and the spring 24, and thus reduces the ampli-tude of said oscillations if it becomes excessive. The mechanical-acoustical oscillations described above may be self-sustaining, but not necessarily self-exciting, because many periods of resonant oscillations of the moving element 4''' may be required to reach the amplitude shown on FIG. 16A and FIG. 16B, where pistons 47a and 47b are suffi-ciently inserted into the ends of the air chamber 46. To promote the oscillations, they might be seeded, which is accom-plished by the processing block 57 running the controllable rectifier in reverse for a short time, that is, generating alter-nating voltage at the resonant frequency from a source such as a starter battery 64. After the oscil-lations reach certain criti-cal amplitude, they become self-sustained, and the controllable rectifier can be switched back to generating electrical energy from the air flow 19.

Figure 18A:
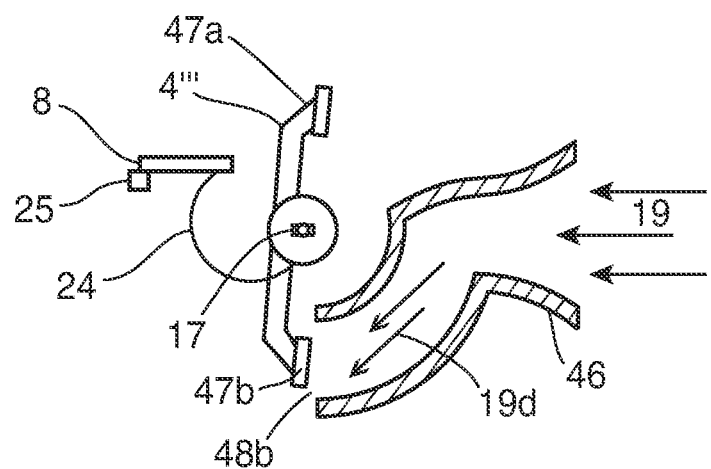
FIG. 18A is a cross sectional view of an embodiment employing a resonant air chamber with one intake opening and only one exit opening, shown in at a point of a rotational oscillatory cycle of a moving element when an exit opening is open.
Figure 18B:
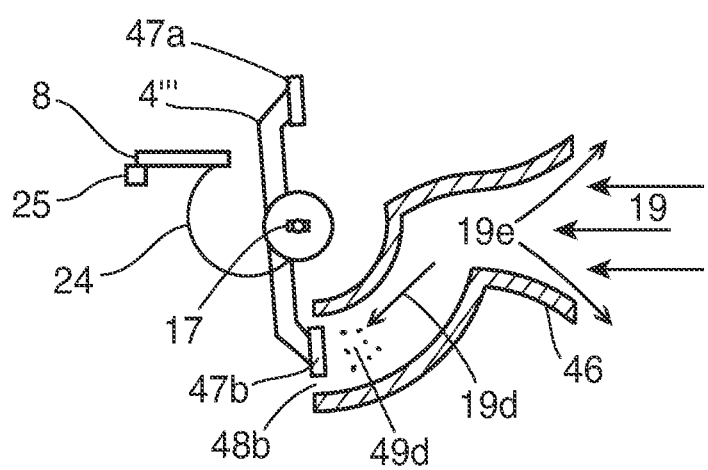
FIG. 18B is a cross sectional view of FIG. 18A shown in at an opposite end point of a cycle, when an exit opening is closed.

In another embodiment, the air chamber 46 may have only one exit openings 48b, as depicted on FIGS. 18A and 18B. In this case, when the exit opening 48b is closing, part of the airflow 19d still goes toward the piston 47b, contributing to high-pressure zone 49d, while another part of airflow 19e exits the air chamber through the entrance, but otherwise the oscillation cycle works the same way as in the embodiment of FIGS. 16A and 16B. The piston 47a, while not directly exposed to the air flow, may be kept for mechanical balance.

Yet alternatively, the air chamber 46 may lack any exit openings, and pistons 47b is replaced with a flexible mem-brane 50, as depicted on FIGS. 19A and 19B. In this case, there is no continuous airflow through the chamber, but instead the alter-nating flow 19d and 19e is going in and out of the chamber, and as long as the acoustic resonant fre-quency of the chamber is close to the mechanical resonant frequency of the moving element 4''', the oscillations may be sustainable.

A torsional spring, and rotationally-vibrating moving ele-ment, is but one of a variety of embodiments covered by this invention. Any mechanical resonator that changes the parameters of the air chamber and has the resonant fre-quency close to the acoustic resonant frequency of the air chamber can fulfill the same role. For example, as depicted on FIG. 20, the membrane 50 can have sufficient rigidity to be its own spring and resonate with appropriate frequency. The piezo element 8'' in this case may be a single piezo layer or a bimorph, deposited directly on the membrane 50, and bending together with it, thus converting part of its mechanical energy into electricity.

The above-discussed embodiments of the present invention are merely exemplary of many variations and permutations of the subject matter disclosed. Mention of one or more representative features of a given embodiment is likewise exemplary: an embodiment can exist with or without a given feature, and likewise, a given feature can be part of other embodiments.

We claim:

1. An electric power generator for a projectile moving through the air, comprising:
   an air chamber formed inside the projectile, said air chamber having at least one air path, said at least one air path connects said chamber to air outside of the projectile;
   a moving member located inside or adjacent to said air chamber, said moving member is exposed to air inside said air chamber, said moving member is configured to vibrate under variations of pressure of air traveling through the projectile;
   an electric machine mechanically connected to said moving member and to a body of the projectile, said electric machine configured to convert mechanical motion of said moving member into electric power;
   a spring having one end attached to said moving member, an opposing end of said spring is retained by the projectile, wherein said spring and said moving member form a resonant system.

2. An electric power generator of claim 1, wherein:
said air chamber includes at least one air inlet and at least one air outlet, said at least one air inlet connects to air outside of the projectile in a high-pressure area in front of the projectile, said at least one air outlet connects to air outside of the projectile in a low-pressure area behind the projectile.

3. An electric power generator of claim 1, wherein:
a movement of said moving member alters the air flow through said at least one air path leading to said air chamber or away from said air chamber synchronously with the movement of said moving member.

4. An electric power generator of claim 1, wherein:
an additional flow control member is linked to said moving member, that alters the air flow through at least one of the air path leading to or from the air chamber synchronously with the movement of said moving member.

5. An electric power generator of claim 1, wherein:
said spring is an integral part of said moving member.

6. An electric power generator of claim 1, wherein:
said spring is a torsional spring.

7. An electric power generator of claim 1, wherein:
said moving member is axially symmetric, said moving member moves through the air based on vibrational motion.

8. An electric power generator for a projectile moving through the air, comprising:
   an air chamber formed inside the projectile, said air chamber having at least one air path connecting said air chamber to air outside of the projectile;
   a moving member located inside or adjacent to said air chamber, said moving member is exposed to air inside said air chamber, said moving member is configured to vibrate under variations of pressure of air traveling through the projectile;
   an electric machine mechanically connected to said moving member, said electric machine is retained in the projectile, said electric machine configured to convert mechanical motion of said moving member into electric power;
   a spring having one end attached to said moving member and an opposing end retained by the projectile, wherein said spring and said moving member form a resonant system; and
   a resonant frequency of the resonant system is close to an acoustic resonance frequency of the air chamber.

9. An electric power generator of claim 8, wherein:
said air chamber includes at least one air inlet and at least one air outlet, said at least one air inlet connects to air outside of the projectile in a high-pressure area in front of the projectile, said at least one air outlet connects to air outside of the projectile in a low-pressure area behind the projectile.

10. An electric power generator of claim 8, wherein:
a movement of said moving member alters air flow through said at least one air path leading to said air chamber or away from said air chamber synchronously with the movement of said moving member.

11. An electric power generator of claim 8, wherein
an additional flow control member is linked to said moving member, that alters the air flow through at least one of the air path leading to or from the air chamber synchronously with the movement of said moving member.

12. The electric power generator of claim 8, wherein:
air flow through said at least one of the air path is controlled by said air chamber with a frequency tuned to approximately match a resonant frequency of said moving member.

13. An electric power generator of claim 8, wherein:
said spring is an integral part of the moving member.

14. An electric power generator of claim 8, wherein:
said spring is a torsional spring.

15. An electric power generator of claim 8, wherein:
said moving member is axially symmetric, said moving member moves through the air based on vibrational motion.

16. An electric power generator of claim 9, wherein:
opposing ends of said moving member are alternately exposed to high-pressure and low-pressure areas of the acoustic resonance of said air chamber.

* * * * *